United States Patent
Ben Horin et al.

(10) Patent No.: US 10,995,785 B2
(45) Date of Patent: May 4, 2021

(54) STRUCTURAL MEMBER AND/OR COUPLING ARRANGEMENT AND/OR METHOD FOR SAME

(71) Applicant: ARKAL AUTOMOTIVE C.S. LTD., Lower Galilee (IL)

(72) Inventors: Amitai Ben Horin, Rakefet (IL); Aiman Younis, Ara (IL); Alexander Yushprakh, Katzrin (IL); Tzion Molla, Migdal Haemek (IL)

(73) Assignee: ARKAL AUTOMOTIVE C.S. LTD., Lower Galilee (IL)

( * ) Notice: Subject to any disclaimer, the term of this patent is extended or adjusted under 35 U.S.C. 154(b) by 0 days.

(21) Appl. No.: 16/975,126

(22) PCT Filed: Jan. 30, 2019

(86) PCT No.: PCT/IB2019/050763
§ 371 (c)(1),
(2) Date: Aug. 23, 2020

(87) PCT Pub. No.: WO2019/162780
PCT Pub. Date: Aug. 29, 2019

(65) Prior Publication Data
US 2021/0003157 A1 Jan. 7, 2021

Related U.S. Application Data

(60) Provisional application No. 62/634,837, filed on Feb. 24, 2018.

(51) Int. Cl.
*F16B 7/04* (2006.01)
*B29C 45/14* (2006.01)
(Continued)

(52) U.S. Cl.
CPC ............... *F16B 7/04* (2013.01); *B29C 45/14* (2013.01); *B29C 45/14311* (2013.01); *B29C 45/14614* (2013.01); *B60R 9/045* (2013.01); *A63G 31/00* (2013.01); *B29L 2031/745* (2013.01); *B62D 27/023* (2013.01); *E04F 11/1817* (2013.01); *E06C 7/50* (2013.01)

(58) Field of Classification Search
CPC ..... F16B 7/04; B29C 45/14; B29C 45/14311; B29C 45/14614; B60R 9/045; A63G 31/00; B29L 2031/745; B62D 27/023; E04F 11/1817; E06C 7/50
See application file for complete search history.

(56) References Cited

U.S. PATENT DOCUMENTS

| | | | |
|---|---|---|---|
| 8,376,444 | B2 | 2/2013 | Scheib et al. |
| 9,555,569 | B2 | 1/2017 | Birka |
| (Continued) | | | |

FOREIGN PATENT DOCUMENTS

| | | |
|---|---|---|
| CN | 1824902 | 8/2006 |
| CN | 206319575 | 7/2017 |
| (Continued) | | |

*Primary Examiner* — D Glenn Dayoan
*Assistant Examiner* — Melissa Ann Bonifazi
(74) *Attorney, Agent, or Firm* — The Law Office of Joseph L. Felber

(57) ABSTRACT

A structural has a coupling region. The coupling region is a region where a fitting and a beam section of the structural member meet and over such region a nipping sleeve of the structural member is over-molded.

18 Claims, 9 Drawing Sheets

(51) Int. Cl.
  *B60R 9/045*  (2006.01)
  *A63G 31/00*  (2006.01)
  *B29L 31/00*  (2006.01)
  *B62D 27/02*  (2006.01)
  *E04F 11/18*  (2006.01)
  *E06C 7/50*  (2006.01)

(56) References Cited

U.S. PATENT DOCUMENTS

2007/0056748 A1  3/2007  Feith et al.
2010/0001552 A1  1/2010  Kim

FOREIGN PATENT DOCUMENTS

DE  10 2014 004 158  9/2015
WO  2015/090987  6/2015

STRUCTURAL MEMBER AND/OR COUPLING ARRANGEMENT AND/OR METHOD FOR SAME

TECHNICAL FIELD

Embodiments of the invention relate to a structural member and/or coupling arrangement and/or method; in particular utilizing plastic over-molding process.

BACKGROUND

Coupling between plastic components that are formed over substructure components (not necessarily made of plastic—such as metal, e.g. aluminum or the like) may be used to form a structural member. Such structural member may thus have relative improved strength while being relative light in weight. Substructure components, possibly in form of beams or the like, may be inserted into an injection mold and subsequent pressurized molding may then take place to form such coupling by plastic components.

A vehicle crossmember, such as a cockpit cross-car beam, a front-end carrier (or the like); may be one example of a structural member where such coupling may take place. Such crossmember may be designed from components at least some of which being formed from lightweight materials. Such a crossmember here forms a transverse structural piece in a structural assembly here being a vehicle's chassis or body—and may be used to support elements such as: an instrument panel, steering column bracket, HVAC, airbags, headlight modules, radiator, windscreen wiper reservoirs (or the like).

WO2015090987 describes a method for producing a cross-member for a dashboard of a vehicle that includes at least one cross-bar and at least one side support arranged to allow the cross-bar to be secured to a vehicle body pillar. The method includes producing a plate and a support sleeve that is mounted on the plate and designed to receive the cross-bar.

U.S. Pat. No. 9,555,569 describes a plastic over-mold aluminum extrusion with an internal web for preventing undesirable collapses under injection or compression molding pressures. A plurality of protrusions and/or local deformations on an outer wall of the extrusion can be used to create strong mechanical interface to the plastic. Localized deformations can result from a combination of the applied plastic pressure under injection or compression molding pressures and the proximity of outer gaps of the internal web structure.

Other structural assemblies including structural members where coupling between plastic components and substructure components may take place, may include: tools or implements (such as ladders, etc.), railings (such as a handrail, etc.), play ground or recreational equipment (such as climbing frames, street workout structures, etc.), racks (such as roof racks, bicycle racks, etc.).

SUMMARY

The following embodiments and aspects thereof are described and illustrated in conjunction with systems, tools and methods which are meant to be exemplary and illustrative, not limiting in scope.

In an embodiment of the invention there is provided a structural member in possible form of a cross member suitable for supporting and/or connecting to vehicle bodywork components, the structural member comprises a coupling region where a fitting and a beam section of the structural member are coupled together by a nipping sleeve of the structural member, wherein the fitting comprises at least one anchoring region and the nipping sleeve being arranged to press at least a portion of the structural member against the anchoring region to form the coupling.

Typically, the fitting comprises a nipple arranged to fit into an open end of the beam section and the nipple comprises the at least one anchoring region. In certain cases, the nipple may form the fitting hence the fitting besides the nipple may not include much more or anything else. Such nipple shaped fitting may e.g. be used as a plug-like formation fitted into an open end of a beam section—not necessarily plugging the open end.

The nipping sleeve typically can be molded onto the beam section where it fits over the fitting in order to press the beam section in this area against the fitting. Such pressing may substantially plastically deform the beam section against the nipple and anchoring regions.

In addition to the exemplary aspects and embodiments described above, further aspects and embodiments will become apparent by reference to the figures and by study of the following detailed descriptions.

BRIEF DESCRIPTION OF THE FIGURES

Exemplary embodiments are illustrated in referenced figures. It is intended that the embodiments and figures disclosed herein are to be considered illustrative, rather than restrictive. The invention, however, both as to organization and method of operation, together with objects, features, and advantages thereof, may best be understood by reference to the following detailed description when read with the accompanying figures, in which.

Figure 1:
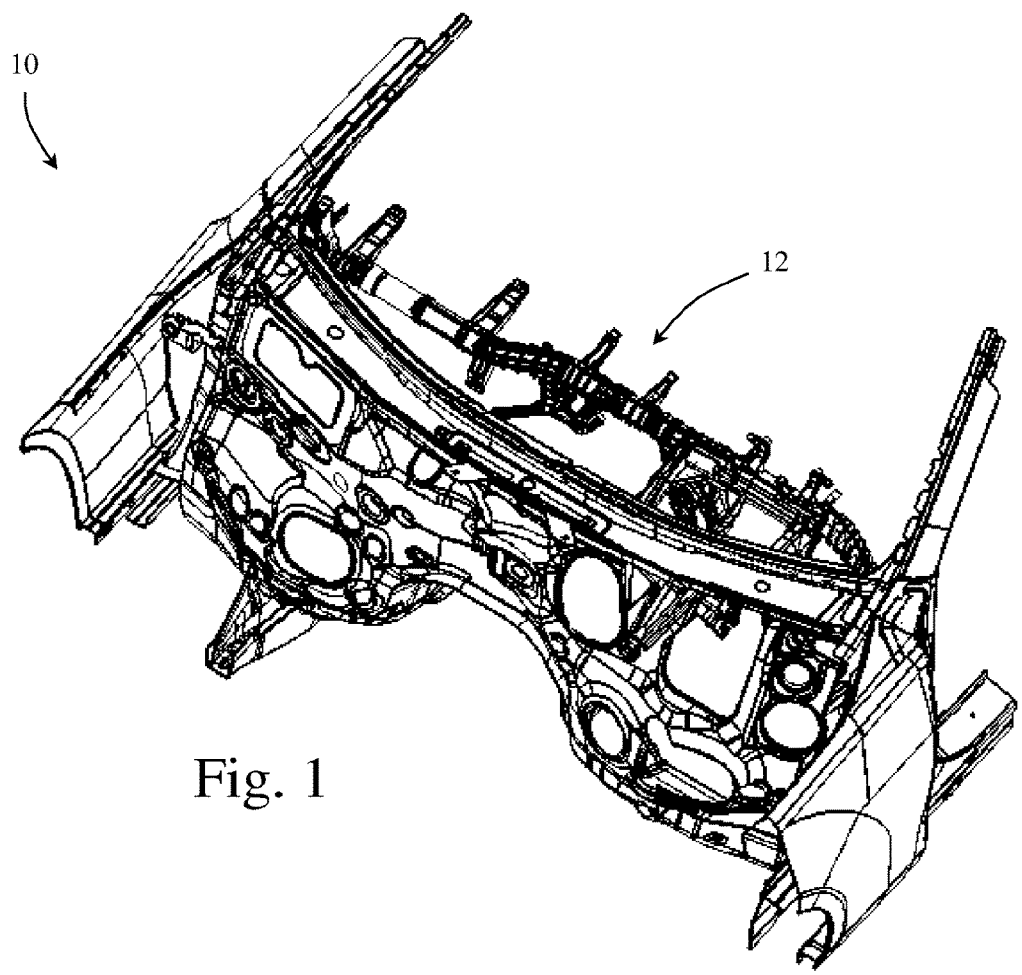
FIG. 1 schematically shows a perspective front view of a structural assembly here in form of a vehicle shell body including a structural member according to one possible embodiment of the invention, here in form of a cross member.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated within the figures to indicate like elements.

DETAILED DESCRIPTION

Attention is first drawn to FIG. 1 schematically showing a perspective front view of a structural assembly here in form of a vehicle BIW (body in White) 10 including a structural member 12 according to one possible embodiment of the invention here in form of lateral extending cross member. Structural member 12 may be located in the region of the vehicle's body illustrated in FIG. 1 and/or in other regions of the vehicle's body.

Structural member 12, in its formation here as a cross member may also possibly be referred to and/or take form of: a cockpit cross-car beam, a front-end carrier (or the like); and may be used for supporting and/or connecting to vehicle bodywork components such as: an instrument panel, a steering column bracket, HVAC modules, airbags, headlight modules, windscreen wiper reservoirs (and the like).

Figure 2:
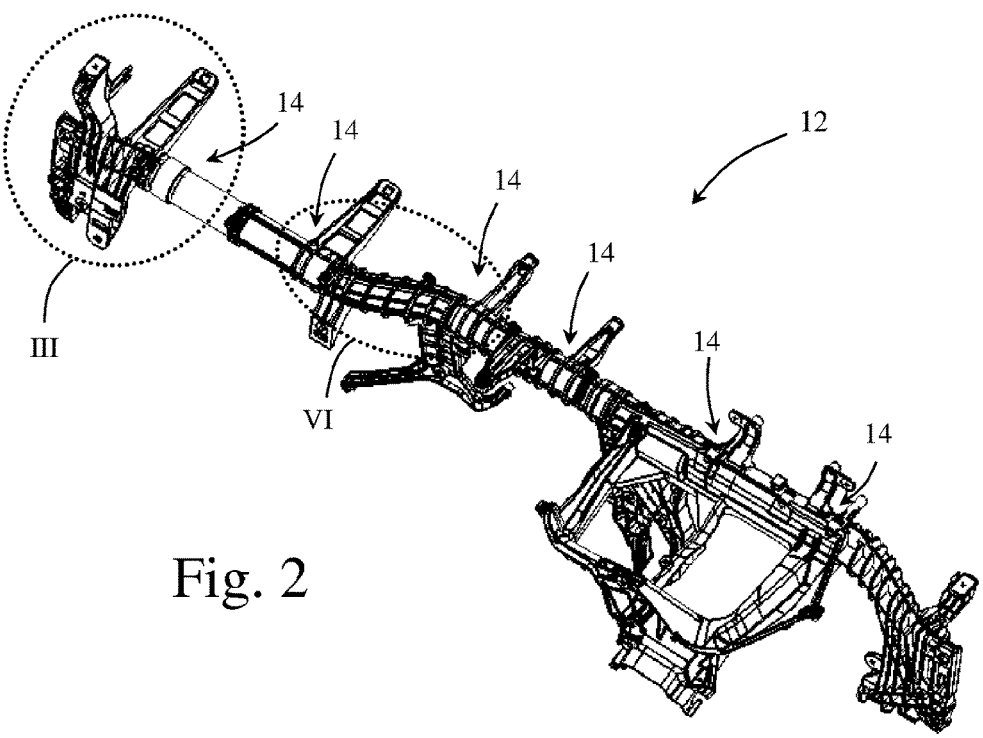
FIG. 2 schematically shows the structural member of FIG. 1.
Figure 3A:
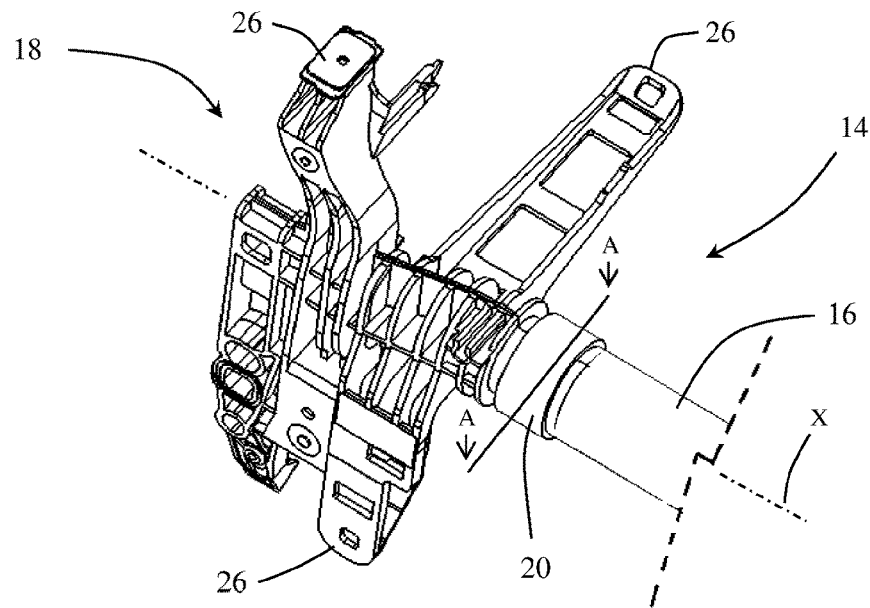
FIGS. 3A and 3B schematically show an embodiment of a possible coupling region marked III within the structural member of FIG. 2, in respective assembled and exploded states; and revealing a fitting, a beam section and a nipping sleeve of the structural member.
Figure 3B:
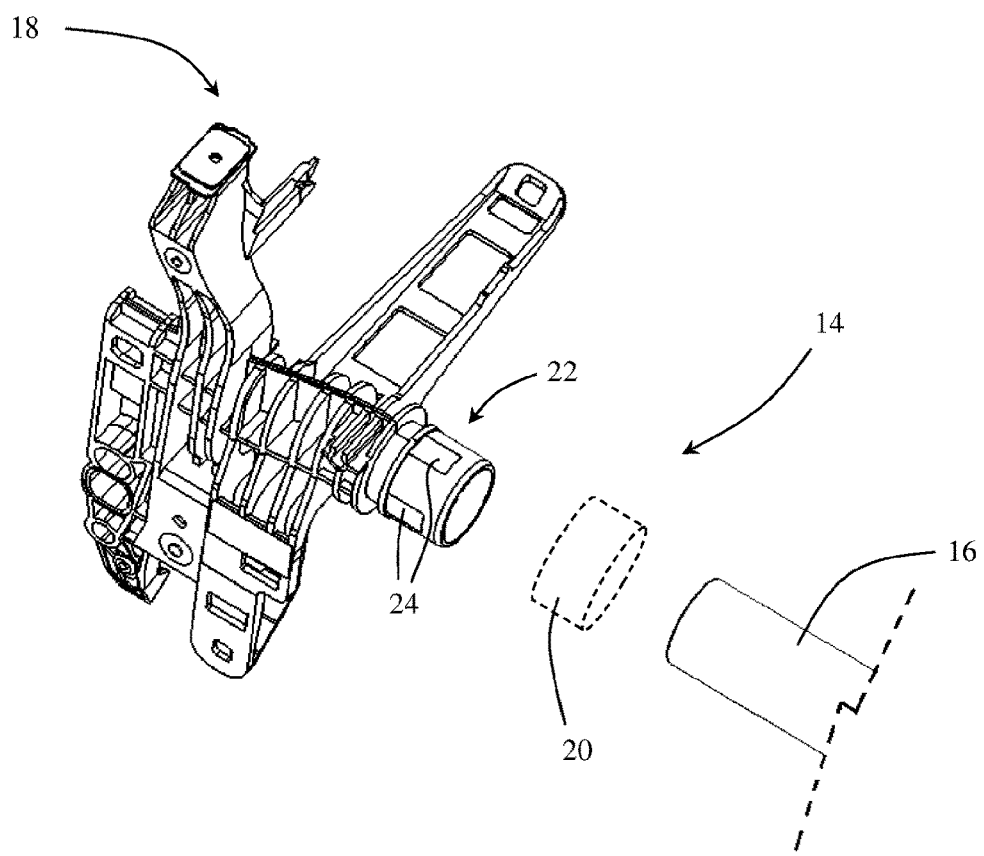

With attention drawn to FIG. 2, structural member 12 may be seen as including along its extension a plurality of coupling regions 14. The coupling regions may be defined as areas along the structural member where coupling between a beam section 16 and a fitting 18 of the structural member takes place. With attention additionally drawn to FIGS. 3A and 3B, such coupling between a beam section 16 and one example of a fitting 18 may be seen as including a nipping sleeve 20 that is molded over an area where the beam section 16 and fitting 18 meet and/or engage.

Fitting 18 in its various forms includes a nipple 22 that may be arranged to fit into an open end of a beam section 16. The nipple may be formed on its outer periphery with one or more anchor regions 24, and in each given coupling region the nipping sleeve 20 can be used to press an area of the beam section that it overlies against the nipple of the fitting associated with the given coupling region.

An anchoring region 24 may be defined as a localized region on the nipple's outer periphery with a geometry that is generally different to the geometry generally present in its surrounding. For example, a generally cylindrical shaped nipple may be formed with an anchoring region on its outer cylindrical periphery that forms or includes a local area where the nipple's general cylindrical shape is not present.

In certain embodiments as e.g. illustrated in FIG. 3, fitting 18 may include one of more brackets 26 for connecting/coupling to other entities, such as in the example of a structural member that is a cross member—to the shell of the vehicle's body and/or to vehicle bodywork components such as: an instrument panel, a steering wheel, heating and ventilation modules, airbags, headlight modules, windscreen wiper reservoirs (and the like).

Fittings according to at least certain embodiments of the present invention may be located at an end of another beam section—and thus coupling at a coupling region may result in coupling between two (or more) beam sections of a structural member (see examples in the structural assemblies of FIGS. 9A to 9D).

Beam section 16 may be formed or may include thermoplastic material. For example, beam section 16 may be formed from composite material such as continuous fiber-reinforced thermoplastics (e.g. organo sheets laminated glass/carbon fabrics or UD tape—laminated Unidirectional glass/carbon fibers or the like). Beam section 16 when exposed to pressurized injection molding of nipping sleeve 20 thereupon may be urged to at least partially deform and/or press against and/or abut nipple 22.

Fitting 18 and/or nipple 22 may be formed from a variety of materials including (but not limited to) aluminum, magnesium, thermoplastic and thermosets, structural plastics (such as PP GF, PA GF, PA CF, PPS GF, POM GF, PBT GF, Epoxy, Polyester, and the like). Fitting 18 and/or nipple 22 thus may be formed from a variety of materials that can provide sufficient support/stiffness (counter force) against pressures applied during the joining phase due to pressure applied during the over-molding of nipping sleeve 20 upon nipple 22 with beam section 16 therebetween. Such provision of sufficient support/stiffness (counter force) may be provided with or without supportive beams/structures e.g. internal supportive beams/structures (such as those indicated below by numeral 29 with respect to FIG. 4)

Materials suitable for forming nipping sleeve 20 may include (but are not limited to) thermoplastic resins, fibers reinforced resins, possibly PE, PP, PS, ABS, PA, and/or PBT, and/or more preferably PP GF, PA GF, PA CF, PPS GF (etc.). Materials suitable for forming nipping sleeve 20 may also or alternatively be defined as being such that permit application of in-cavity pressures suitable for proper joining between nipping sleeve 20, beam section 16 and nipple 22. In a non-binding example, such suitable in-cavity pressures may be defined as above about 17 MPa and preferably above about 20 MPa.

Figure 4A:
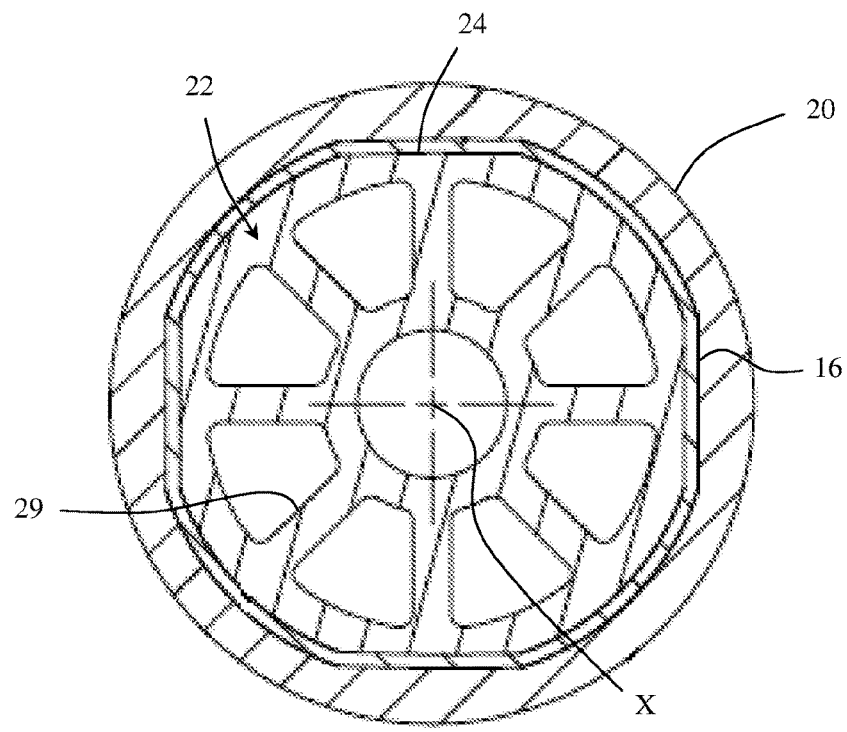
FIG. 4A schematically shows a cross sectional view of the coupling region of FIG. 3A taken along plane A-A.
Figure 4B:
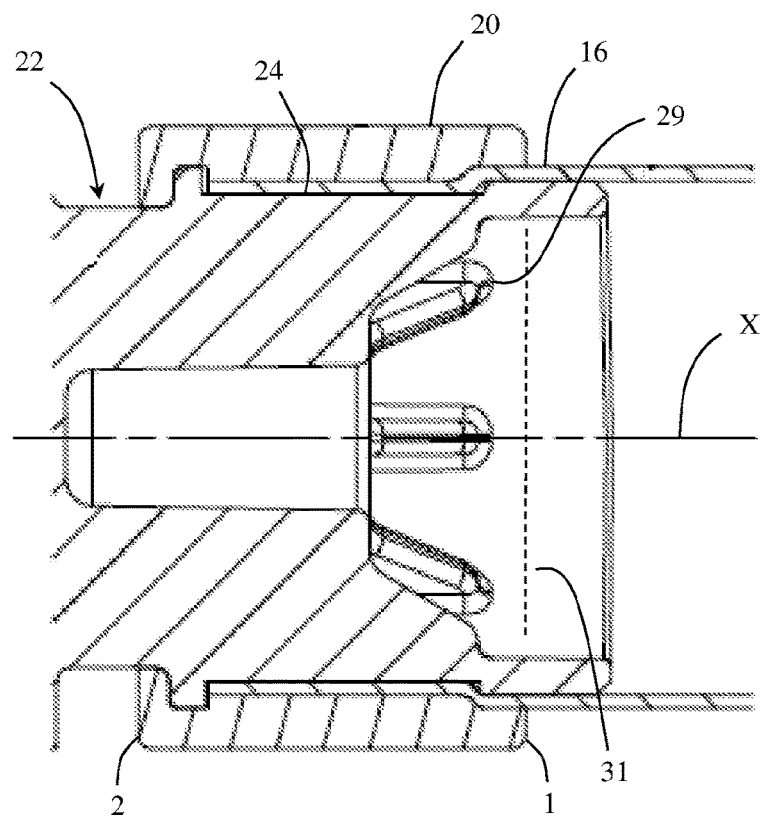
FIG. 4B schematically shows a cross sectional view of the coupling region of FIG. 3A taken along a plane including axis X indicated in FIG. 3A.

With attention additionally drawn to the cross-sectional views seen in FIGS. 4A and 4B—such mutual engagement formed between the beam section 16 and fitting 18 may be seen. Here beam section 16 can be seen to have been deformed to closely follow the outer contour of nipple 22 including areas of the nipple including the anchor regions 24.

Such abutting engagement formed by nipping sleeve 20 between the beam section 16 and the anchor regions on nipple 22, may be useful in assisting in resisting relative movements between the beam section and fitting, and/or in the fixing in place of beam section 16 relative to fitting 18—during intended use of a structural member 12 including coupling regions 14 as discussed.

In the illustrated example, such resistance to movements may be about a central axis X of the fitting's nipple. As seen in FIG. 4A the optional planar shaped anchor regions 24 formed about axis X may act as abutting structures that can counter possible moment forces that may act to urge rotation or twisting between beam section 16 and nipple 22.

FIG. 4B exemplifies possible resistance to movement generally along axis X formed e.g. by bulging and/or step-like formations located along or within the anchor regions 24 that can be used to resist forces acting to axially displace the beam section and fitting apart.

FIGS. 4A and 4B also illustrate possible provision of supportive beams/structures 29 for internally supporting nipple 22 against pressure applied during pressurized injection of nipping sleeve onto the nipple. Such optional beams/structures 29 if used may be defined as not extending axially beyond the location where nipping sleeve is designed to be injected—here marked by the dashed line 31.

Figure 5A:
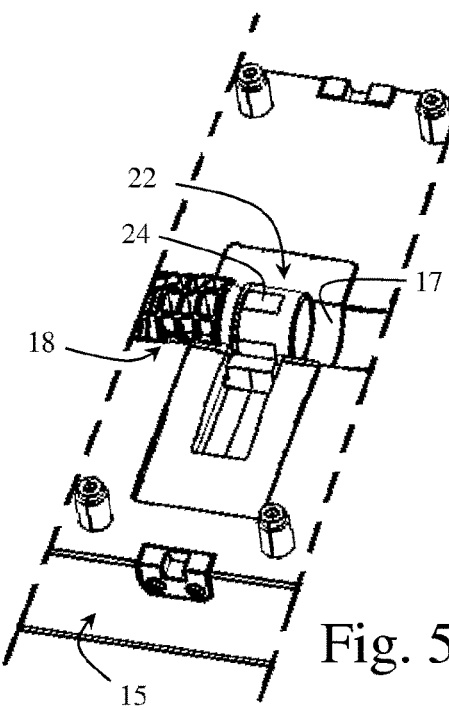
FIGS. 5A to 5C schematically show possible molding steps at least some of which may be taken for forming at least certain coupling region embodiments of the invention.
Figure 5B:
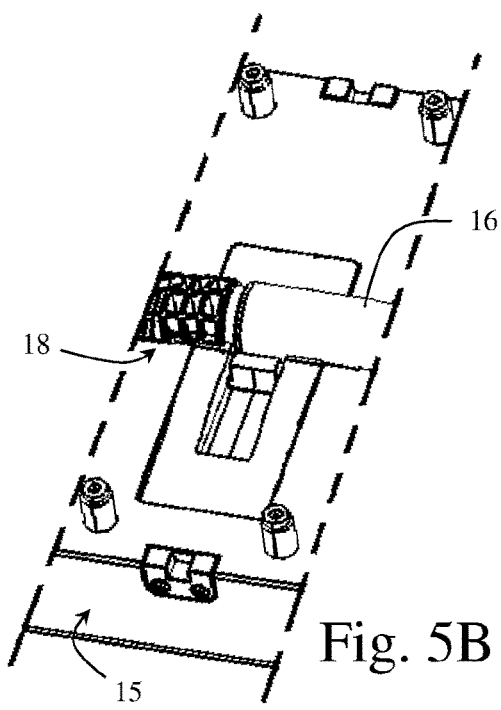
Figure 5C:
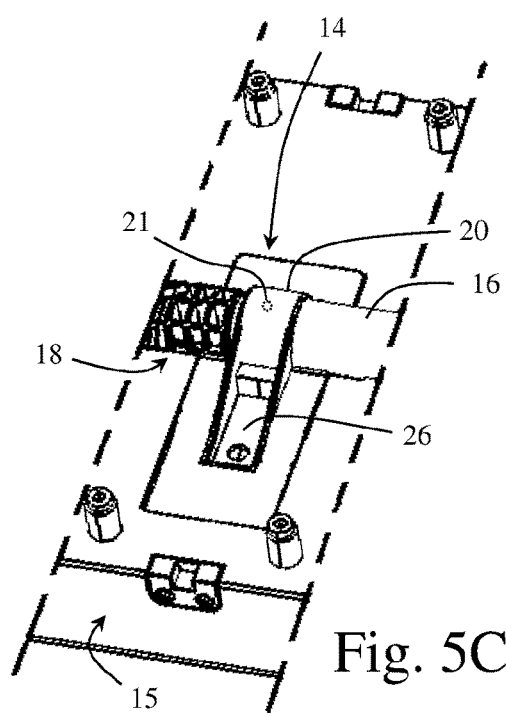

Attention is drawn to FIGS. 5A to 5C illustrating possible injection molding steps taken for creating a coupling region 14 along one possible embodiment of a structural member 12 of the invention. In these figures, only one mold part 15 is shown revealing an interior side of the mold, and it is to be understood that one or more further mold part(s) may be used together with part 15 during injection molding.

In a first possible step seen in FIGS. 5A and 5B, a prior fabricated fitting 18 and beam section 16 may be placed within a mold. Fitting 18 and beam section 16 may be placed one after the other or already fitted together within the mold. In this illustrated example, the fitting's nipple 22 and a portion of the beam section 16 fitted over the nipple are placed within a cavity 17 of the mold, which is arranged for receiving pressurized molten material for the forming of a nipping sleeve 20 thereupon.

In the shown example, nipping sleeve 20 is illustrated being possibly formed with an optional integral bracket 26, suitable in the structural member for connecting to other entities such as in a cross member example to a shell of the vehicle's body and/or to vehicle bodywork components such as: an instrument panel, a steering wheel, heating and ventilation modules, airbags, headlight modules, windscreen wiper reservoirs (and the like).

Nipping sleeve 20 formed by injected pressurized molten material is configured to deform and/or urge the beam section where it fits over the nipple to closely engage the nipple 22 and its anchoring regions 24. Formation of required forces for urging controlled deformation and/or close abutment of a beam section over a nipple, may be accomplished by various means.

For example, the nipping sleeve may be designed to have a suitable projection surface bearing against the beam section for forming required forces for creating the required deformation. For example, the projection surface may be chosen to be substantially larger than other possible structures molded together with the nipping sleeve upon areas in the structural member.

In a further example, a gating point (see schematically illustrated by numeral 21 in FIG. 5C) forming an opening where molten plastic material is injected into the nipping sleeve's cavity; may be chosen to be in proximity to the formed nipping sleeve so that pressure with the nipping sleeve's cavity is optimal, possibly maximal. In certain cases, the gating point (as illustrated) may be chosen to be at the nipping sleeve e.g. possibly identifiable on an outer exposed side/surface of the nipping sleeve.

Figure 6A:
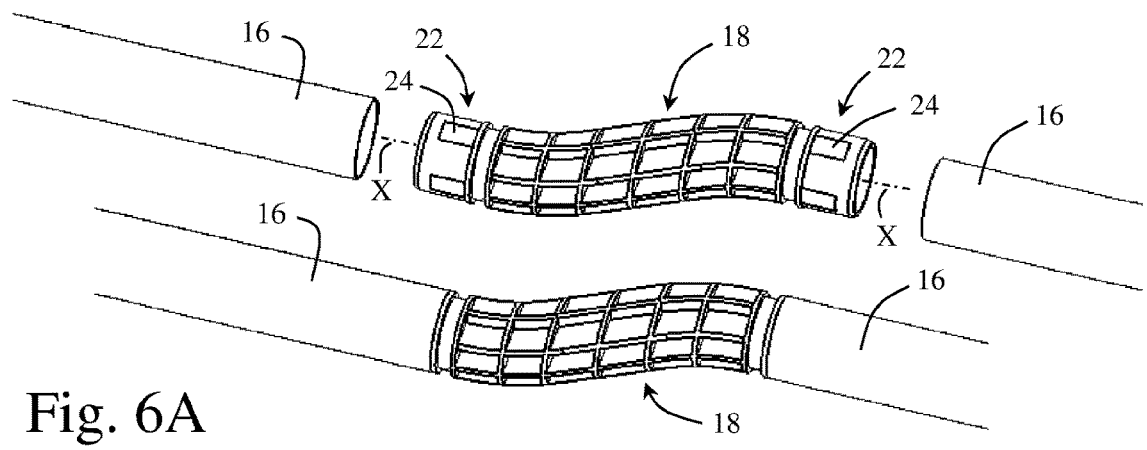
FIGS. 6A to 6C schematically show further coupling region embodiments marked VI within the crossmember of FIG. 2.

Attention is drawn to FIG. 6A illustrating an embodiment of a fitting 18 having an extension that follows an axis X, where in this example the extension is slightly curved. Fitting 18 of this embodiment, includes a nipple 22 at each axial end and each nipple includes one or more anchoring regions 24 on its outer periphery.

At the upper side of FIG. 6A, fitting 18 and two beam sections 16 arranged to attach to respective nipples 22 at each one of its axial ends, are illustrated in an exploded un-attached state; and at the lower side of FIG. 6A, the beam sections 16 are shown fitted onto both axial ends of the fitting 18. The beam sections fitted on both axial ends of the fitting, represents a state generally similar to that illustrated in FIG. 5B just before over-molding the nipping sleeve.

In the embodiment illustrated in FIG. 6A, the over molding of the nipping sleeves may be envisioned as e.g. being made within one single mold including two cavities one for the formation of each nipping sleeve. Alternatively, a mold may be used for over molding only one nipping sleeve onto one location where the beam section and nipple meet.

Figure 6B:
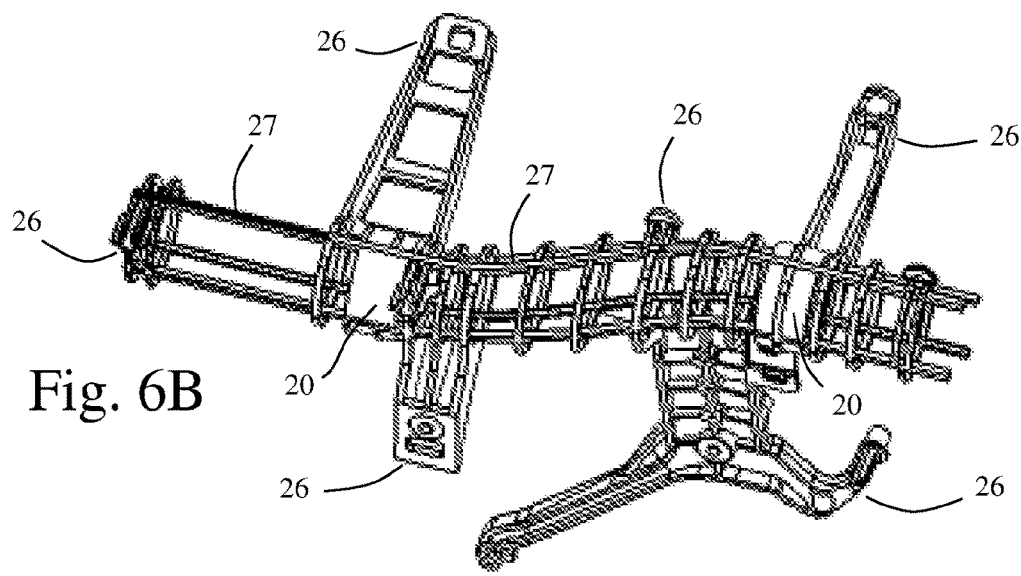

FIG. 6B illustrates an imaginative view for illustration purposes only, showing an optional structure designed to be injected over areas of the connected fitting 18 and beam sections 16 of FIG. 6A. This structure as seen includes two nipping sleeves 20 (one for each merge of a nipple and a beam section), optional brackets 26 and optional struts 27 connecting between the nipping sleeves 20 and brackets 26 and possibly serving as supportive elements and/or channels for flow of molten material towards all areas of this optional molded structure.

Figure 6C:
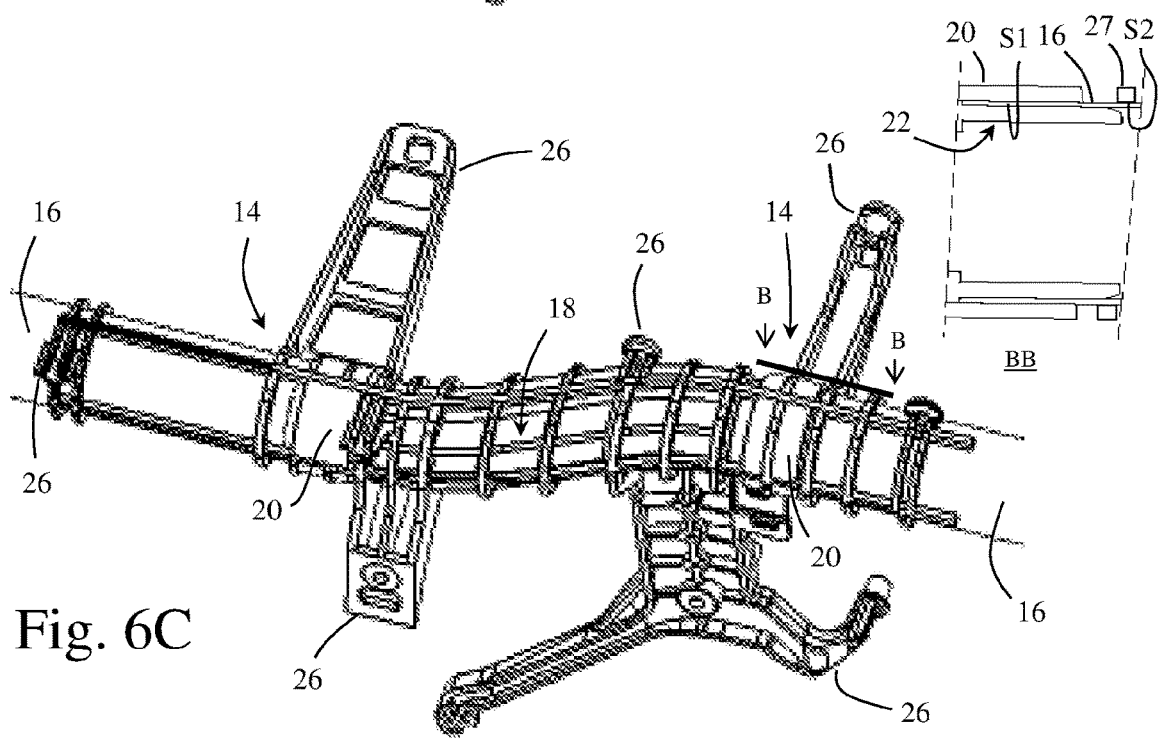

FIG. 6C provides a view of the fitting and beam sections of FIG. 6A with the optional structure seen in FIG. 6B molded thereupon. The molded nipping sleeves 20 accordingly serve for enhancing connection between each beam section 16 and its associated nipple 22 by deforming and/or urging each beam section 16 to closely follow the nipple's contour, inter alia, along its anchoring regions 24. Additional structures molded together with the nipping sleeves 20, such as the brackets 26, provide connecting regions to other possible entities, such as in a structural member being a cross member—to the shell of the vehicle's body and/or to vehicle bodywork components also in areas outside of the fitting such as on the beam section 16 itself.

Cross-section B-B at the upper right-hand side of FIG. 6C, illustrates the relative large projection surface S1 that nipping sleeve has upon beam section 16, which assists in obtaining effective/controlled deformation of the beam section upon nipple 22 and the anchoring regions 24 on the nipple.

This relative large projection surface S1 can be seen in comparison e.g. to the relative small projection surface S2 that one of the optional struts 27 injected together with nipping sleeve 20 onto beam section 16 exhibits, which consequently results in smaller forces in such strut 27 being imposed upon the beam section and in turn in lower or substantial no deformation of the beam section in this area.

Nipping sleeve 20 in at least certain embodiments, in comparison to other structures molded together with it onto a beam section 16; may be defined as having a substantially non-interrupted projection surface S1 that is substantially larger than other non-interrupted projection surfaces, such as projection surface S2 of strut 27.

The nipping sleeve may be defined as extending between two axial ends (see ends 1, 2 marked in FIG. 4B) and including an inner projection surface S1 that extends continuously and substantially un-interrupted between the axial ends 1, 2—and which is arranged to bear against the beam section to press it against the fitting including areas in the fitting where the anchoring regions are present.

Figure 7A:
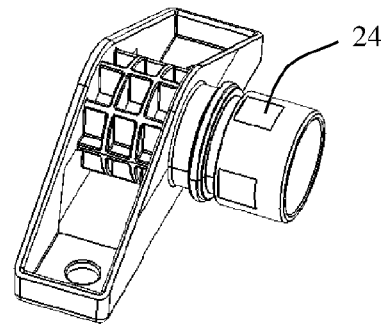
FIGS. 7A to 7E schematically show perspective views of various fitting embodiments.
Figure 7B:
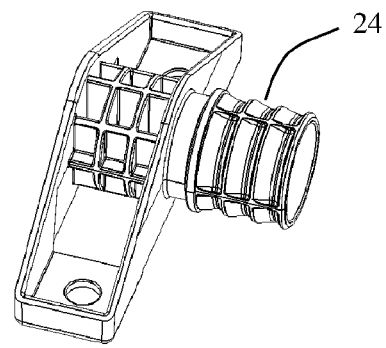
Figure 7C:
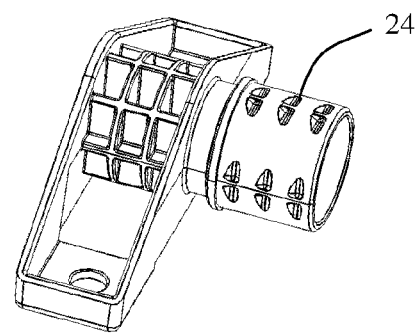

Attention is drawn to FIGS. 7A to 7E illustrating various fitting embodiments and various forms that the anchoring regions 24 may take in accordance with various embodiments of the invention. In FIG. 7A, the anchoring regions take form of planar faces formed about the nipple generally similar to those illustrated in the former figures. In FIG. 7B, the anchoring regions take form of peripheral extending barb formations on the nipple. In FIG. 7C, the anchoring regions take form of indentations formed on the nipple.

Figure 7D:
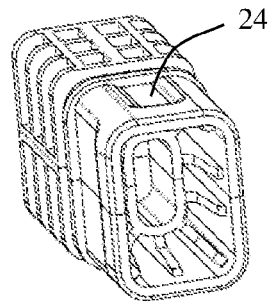
Figure 7E:
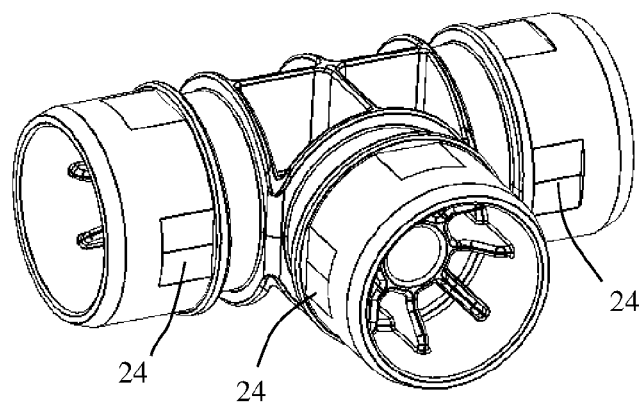

In FIG. 7D, the fitting and nipple are shown possibly embodying a generally rectangle-like formation in a cross-section perpendicular to the fitting's axis (see, e.g., axis X in FIG. 4 of the fitting's nipple). As in the former generally cylindrical shaped fittings/nipples, the fitting of FIG. 7D includes anchoring regions 24, here optionally taking form of indentations with planar bottoms—however other type anchoring regions may also be possible—such as bulging formations (etc.). FIG. 7E exemplifies a fitting including more than two nipples, here three nipples each including anchoring regions. Such T-like formation of a fitting may be useful in connecting several beam sections, here three beam sections, together.

Figure 8A:
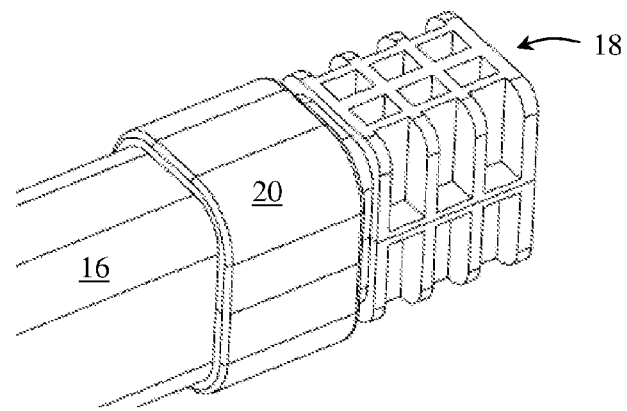
FIGS. 8A and 8B schematically show a coupling region including the fitting of FIG. 7D.
Figure 8B:
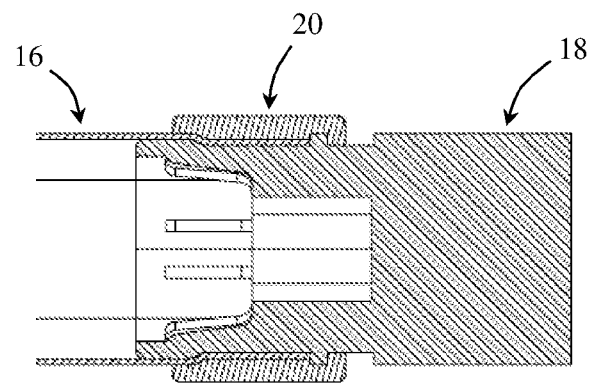

Attention is drawn to FIGS. 8A and 8B illustrating a coupling region utilizing a fitting generally similar to that in FIG. 7D. The coupling region (similar to former discussed coupling regions) includes a nipping sleeve 20 that is molded over an area where a beam section 16 and the fitting 18 meet and/or engage.

It is noted that any other structural formation formed on the nipple upon which the beam section may be deformed, may serve as a suitable anchoring region. Also it is noted that the nipples and anchoring regions illustrated e.g. in FIGS. 7A to 7E may be included in fittings that have other form to the one illustrated in these figures. In some cases, the nipples may in fact constitute the fitting itself—thus forming a plug like structure aimed to plug or partially close an open end of a beam section.

Attention is drawn to FIGS. 9A to 9D illustrating various structural assemblies that may include various embodiments structural members and/or coupling regions here discussed.

Figure 9A:
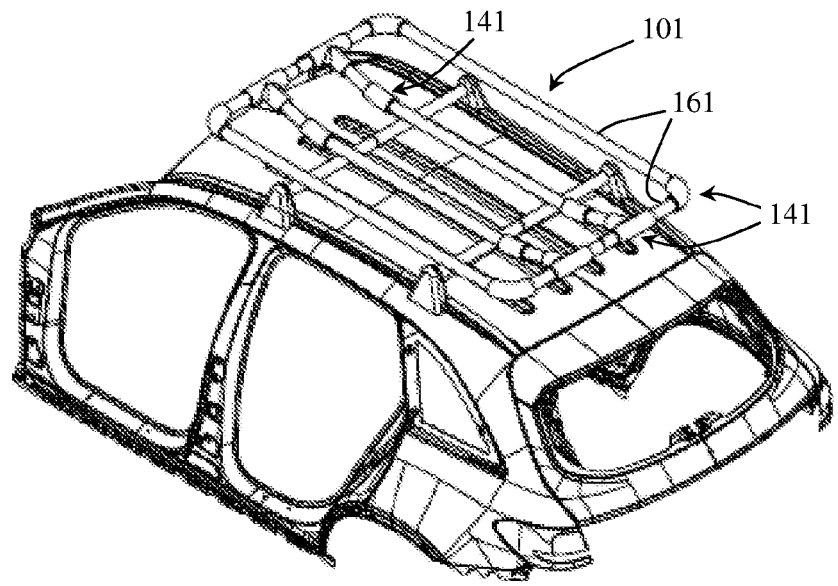
FIGS. 9A to 9D schematically shows various structural assemblies that may include structural members and/or coupling region embodiments of the present invention.
Figure 9B:
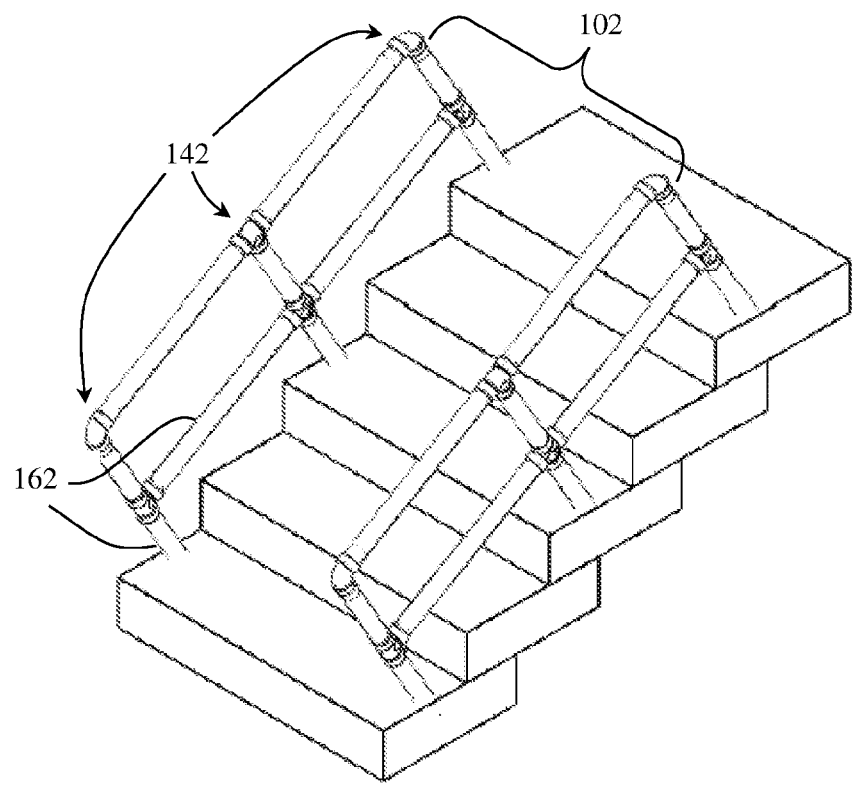

FIG. 9A illustrates a structural assembly 101 in formation of a roof rack arranged to be fitted onto a roof top of a vehicle. Structural assembly 101 includes coupling regions 141 connecting between beam sections 161 to form structural members of the assembly. The structural assembly 102 in FIG. 9B is in formation of a hand rail here fitted along a staircase—with again beam sections 162 and coupling regions 142 being shown connecting to each other to form structural members of assembly 102.

Figure 9C:
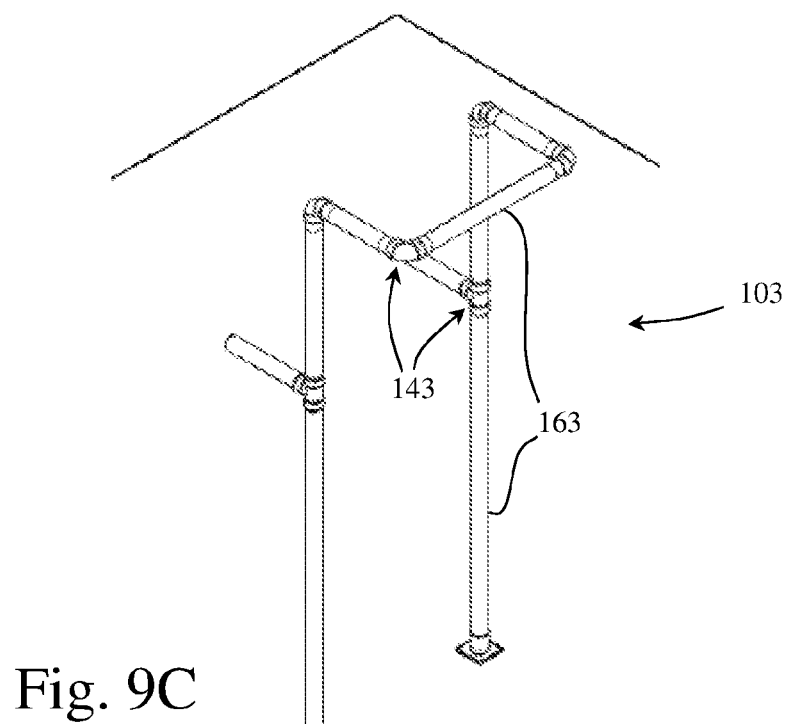
Figure 9D:
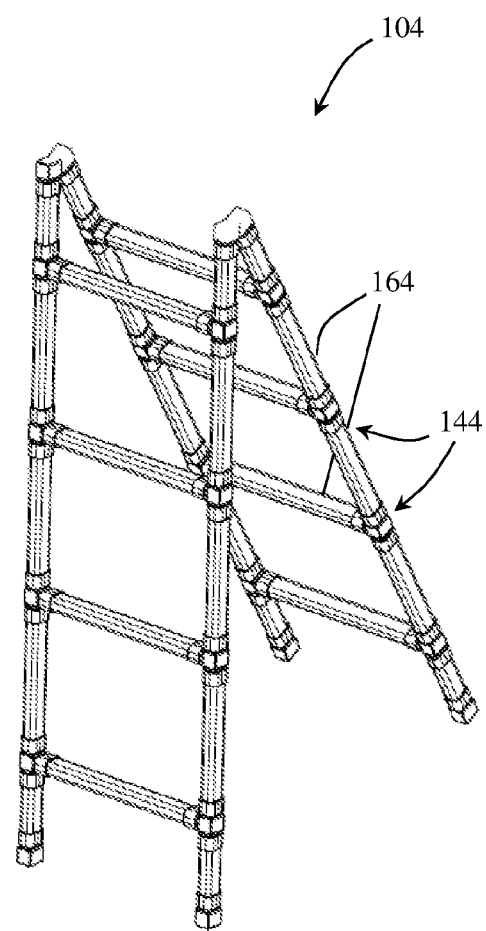

FIG. 9C illustrates a structural assembly 103 in formation of a street workout structure—again including coupling regions 143 connecting between beam sections 163 to form structural members of the assembly. And, FIG. 9D illustrates a structural assembly 104 in formation of a ladder—again including coupling regions 144 connecting between beam sections 164 to form structural members of the assembly.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

Further more, while the present application or technology has been illustrated and described in detail in the drawings and foregoing description, such illustration and description are to be considered illustrative or exemplary and non-restrictive; the technology is thus not limited to the disclosed embodiments. Variations to the disclosed embodiments can be understood and effected by those skilled in the art and practicing the claimed technology, from a study of the drawings, the technology, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures can not be used to advantage.

The present technology is also understood to encompass the exact terms, features, numerical values or ranges etc., if in here such terms, features, numerical values or ranges etc. are referred to in connection with terms such as "about, ca., substantially, generally, at least" etc. In other words, "about 3" shall also comprise "3" or "substantially perpendicular" shall also comprise "perpendicular". Any reference signs in the claims should not be considered as limiting the scope.

Although the present embodiments have been described to a certain degree of particularity, it should be understood that various alterations and modifications could be made without departing from the scope of the invention as hereinafter claimed.

The invention claimed is:

1. A structural member comprising a coupling region where a fitting and a beam section of the structural member are coupled together by a nipping sleeve of the structural member,
the fitting comprises a nipple arranged to fit into an open end of the beam section while a portion of the fitting remains outside of the beam section, and the nipple comprises at least one anchoring region,
the nipping sleeve being arranged to press at least a portion of the beam section against the anchoring region to form the coupling, wherein
the anchoring region comprising a generally planar face in form of a localized region on the nipple's outer periphery with a geometry that is generally different to the geometry generally present in its surrounding, and
the anchoring region being arranged to resist relative movements between the beam section and fitting about a central axis X of the fitting and generally along the central axis X by provision of bulging and/or step-like formations located along or within the anchor region.

2. The structural member of claim 1, wherein the nipping sleeve being molded onto the beam section where it fits over the fitting in order to press the beam section in this area against the fitting.

3. The structural member of claim 1 and comprising brackets for supporting and/or connecting to other components outside of the structural member.

4. The structural member of claim 3, wherein the brackets are formed integral with the nipping sleeve.

5. The structural member of claim 3, wherein the brackets integral with the nipping sleeve are also formed upon the beam section.

6. The structural member of claim 3, wherein the brackets are formed integral with the fitting.

7. The structural member of claim 1, wherein the nipping sleeve has a projection surface on the beam section larger than any other projection surface that other structures molded, possibly together with the nipping sleeve, onto the beam section may have on the beam section.

8. The structural member of claim 7, wherein the nipping sleeve extends in a direction along the beam section between two axial ends and the nipping sleeve's projection surface extends continuously and substantially un-interrupted between these ends.

9. The structural member of claim 8, wherein a gating point where molten plastic material is injected to form the nipping sleeve is in proximity to the nipping sleeve, possibly on an outer face of the nipping sleeve.

10. The structural member of claim 9 and comprising a plurality of coupling regions.

11. The structural member of claim 10 and being adapted to be comprised in any one of: a vehicle bodywork e.g. as a cross member; a rack e.g. roof rack of a vehicle; a railing e.g. a hand rail, play ground or recreational equipment e.g. climbing frames, street workout structures; tools or implements e.g. ladder.

12. A method of forming a structural member comprising the steps of:
providing a mold,
providing a pre-fabricated fitting and a pre-fabricated beam section,
placing the fitting and beam section in the mold, and
injecting a nipping sleeve onto a region where the fitting and beam section meet in order to firmly attach them together, wherein
the fitting comprises a nipple arranged to fit into an open end of the beam section while a portion of the fitting remains outside of the beam section, and the nipple comprises at least one anchoring region, the anchoring region comprising a generally planar face being arranged to resist relative movements between the beam section and fitting about a central axis X of the fitting and generally along the central axis X by provision of bulging and/or step-like formations located along or within the anchor region.

13. The method of claim 12, wherein the fitting and beam section meet by at least a portion of the beam section overlaying the anchoring region.

14. The method of claim 12, wherein a gating point of the mold for injection of molten plastic material for the nipping sleeve is in proximity to the nipping sleeve, possibly on an outer face of the nipping sleeve.

15. The method of claim 12, wherein the structural member being adapted to be comprised in any one of: a vehicle bodywork e.g. as a cross member; a rack e.g. roof rack of a vehicle; a railing e.g. a hand rail, play ground or recreational equipment e.g. climbing frames, street workout structures; tools or implements e.g. ladder.

16. The structural member of claim 14, wherein at least some of the fittings comprise more than one nipple for attaching to several beam sections.

17. A structural member comprising a plurality of beam sections and fittings, and each fitting being coupled to at least one beam section, wherein the structural member comprises a plurality of nipping sleeves each over molded upon a distinct region of the structural member where coupling between a fitting and a beam section occurs, wherein each fitting comprises at least one nipple and coupling between a fitting and a beam section is by placing a fitting's nipple into an open end of a beam section while a portion of the fitting remains outside of the beam section, and wherein each nipple comprises at least one anchoring region comprising a generally planar face in form of a localized region on the nipple's outer periphery with a geometry that is generally different to the geometry generally present in its surrounding, and the anchoring region being arranged to resist relative movements between the beam section and fitting about a central axis X of the fitting and generally along the central axis X by provision of bulging and/or step-like formations located along or within the anchor region, and wherein each nipping sleeve being arranged to press at least a portion of the beam section against the anchoring region to form the coupling.

18. The structural member of claim 17, wherein the nipping sleeves are over molded upon the structural member at spaced apart locations along the structural member.

* * * * *